(12) United States Patent
Boller et al.

(10) Patent No.: US 10,708,214 B2
(45) Date of Patent: Jul. 7, 2020

(54) DETERMINING OVERALL MESSAGE STATUS IN A MESSAGE PROCESSING SYSTEM

(71) Applicant: SAP SE, Walldorf (DE)

(72) Inventors: Stefan Boller, Heidelberg (DE); Markus Muenkel, Hockenheim (DE)

(73) Assignee: SAP SE, Walldorf (DE)

( * ) Notice: Subject to any disclaimer, the term of this patent is extended or adjusted under 35 U.S.C. 154(b) by 343 days.

(21) Appl. No.: 15/669,356

(22) Filed: Aug. 4, 2017

(65) Prior Publication Data
US 2019/0044909 A1  Feb. 7, 2019

(51) Int. Cl.
*G06F 15/16* (2006.01)
*H04L 12/58* (2006.01)

(52) U.S. Cl.
CPC .............. *H04L 51/30* (2013.01); *H04L 51/26* (2013.01); *H04L 51/34* (2013.01)

(58) Field of Classification Search
None
See application file for complete search history.

(56) References Cited

U.S. PATENT DOCUMENTS

| | | | | |
|---|---|---|---|---|
| 2007/0067411 A1* | 3/2007 | Angelov | ............... | G06F 9/546 709/217 |
| 2008/0040457 A1* | 2/2008 | Nygard | ............... | G06Q 10/10 709/220 |
| 2008/0107115 A1* | 5/2008 | Cai | ............... | G06F 9/544 370/392 |
| 2008/0244616 A1* | 10/2008 | Brunswig | ............... | G06F 9/542 719/315 |
| 2011/0145125 A1* | 6/2011 | Foygel | ............... | G06Q 30/0601 705/37 |
| 2012/0290705 A1* | 11/2012 | Befort | ............... | G06Q 10/06 709/224 |
| 2017/0264485 A1* | 9/2017 | Papleux | ............... | H04L 41/0806 |

* cited by examiner

*Primary Examiner* — Mohamed Ibrahim
(74) *Attorney, Agent, or Firm* — Buckley, Maschoff & Talwalkar LLC

(57) ABSTRACT

Systems and methods for determining an overall message status in a message processing system having distributed message processing components. If there are no active status providers, the overall message status remains equal to an old status. If there is only one active status provider, an intermediate calculated status is equal to a message status of the active status provider. If there are more than one active status providers, an intermediate calculated status is equal to a highest priority message status among the active status providers. If there are one or more active status providers, the overall message status remains equal to the old overall message status if the old overall message status is a designated final status and if the old overall message status has a higher priority than that of the intermediate calculated status Otherwise, the overall message status is set equal to the intermediate calculated status.

20 Claims, 6 Drawing Sheets

```
public enum MessageStatus {
    /**
     * Message processing successfully completed. This is a final status.
     */
    COMPLETED(CompletedStatus.INSTANCE, 0, true),
    /**
     * Message processing completed with an error. This is a final status.
     */
    FAILED(FailedStatus.INSTANCE, 10, true),
    /**
     * Message is being processed
     */
    PROCESSING(ProcessingStatus.INSTANCE, 100, false),
    /**
     * Message is in retry
     */
    RETRY(RetryStatus.INSTANCE, 110, false),
    /**
     * Message is in error state, retries are possible
     */
    ERROR(ErrorStatus.INSTANCE, 120, false),
    /**
     * Message is manually cancelled
     */
    CANCELLED(CancelledStatus.INSTANCE, 210, true),
    /**
     * Message is escalated. This is a final status.
     */
    ESCALATED(EscalatedStatus.INSTANCE, 220, true);
}
```

FIG. 5

DETERMINING OVERALL MESSAGE STATUS IN A MESSAGE PROCESSING SYSTEM

FIELD OF THE INVENTION

The disclosed embodiments are directed to determining an overall message status in a message processing system having distributed message processing components.

BACKGROUND

A conventional message processing system may have several distributed message processing components. In such systems, it is difficult to provide a mechanism which gives a meaningful overall status for a particular message, i.e., one that completely and accurately describes the status of the processing of the message by the system. Typically, there is neither a central instance which orchestrates the message processing and controls all the independent message processing components, nor a fixed choreography which determines the order of the processing in the various components. Furthermore, new components can appear and disappear dynamically, which makes it difficult to determine an accurate status.

SUMMARY

In one aspect, the disclosed embodiments are a method, and corresponding system and software, for determining an overall message status in a message processing system. The method includes receiving message statuses output by active status providers, the active status providers being adapted to output message statuses for respective runtime component instances. The active status providers and runtime component instances execute on one or more computer processors having associated memory. The message statuses are from a defined set of message statuses, each of the message statuses in the defined set having a designated priority.

The method further includes determining a quantity of active status providers and based on the determined quantity: determining, if there are no active status providers, that the overall message status is to remain equal to an old overall message status, determining, if there is only one active status provider, an intermediate calculated status which is equal to a message status of the one active status provider, and determining, if there are more than one active status providers, an intermediate calculated status which is equal to a highest priority message status among message statuses of said more than one active status providers.

The method further includes, if there are one or more active status providers, performing: determining that the overall message status is to remain equal to the old overall message status if the old overall message status is a designated final status and if the old overall message status has a higher priority than that of the intermediate calculated status, and setting the overall message status to be equal to the intermediate calculated status if the old overall message status is not a designated final status or if the old overall message status does not have a higher priority than that of the intermediate calculated status.

BRIEF DESCRIPTION OF THE DRAWINGS

FIG. 5 is a code excerpt showing values assigned to parameters for the priority and finality of each state in a set of defined message processing status states.

DETAILED DESCRIPTION

Disclosed embodiments are directed to determining an overall message status in a message processing system having independent, distributed message processing components which might process messages in parallel and/or asynchronously. Each of the message processing components provides its own status, which contributes to an overall message status. In addition, each message processing component can signal the cancellation of the processing of a particular message and, in such a case, no further status changes by the message processing components will occur.

Disclosed embodiments provide a central Status Engine, which is attached to a message being processed via a message processing log. Each message processing component registers itself with the central Status Engine as a "Status Provider." Whenever a registered Status Provider discovers a status change for a particular message, it informs the central Status Engine, which triggers the recalculation of the overall status for the message. Because the central Status Engine knows about all currently-registered Status Providers, it can use the current status of all of them in the calculation of the overall status of the processing of the message. Depending on the number of registered Status Providers, their individual status, and the old overall message status, the new overall message status for the message is calculated. In the overall message status calculation, each status reported by a Status Provider has a particular priority. In the calculation, the statuses with higher priority have precedence. Furthermore, each status can be either a final status or a temporary status, which is also taken into account in the overall message status calculation.

In disclosed embodiments, the algorithm for the overall message status calculation is as follows:

1. If there is no active status provider, the old overall message status becomes the new overall message status;
2. If there is only one active status provider, the overall message status is the status of the single active Status Provider;
3. If there is more than one status provider, the status provider having the status with the highest priority is determined;
4. If the old status is a final one, and the old status has a higher priority than that of the Status Provider determined in step 3, then the old overall message status is used as the new overall message status; and
5. In all other cases, the overall message status is the status of the Status Provider determined in step 3.

Figure 1:
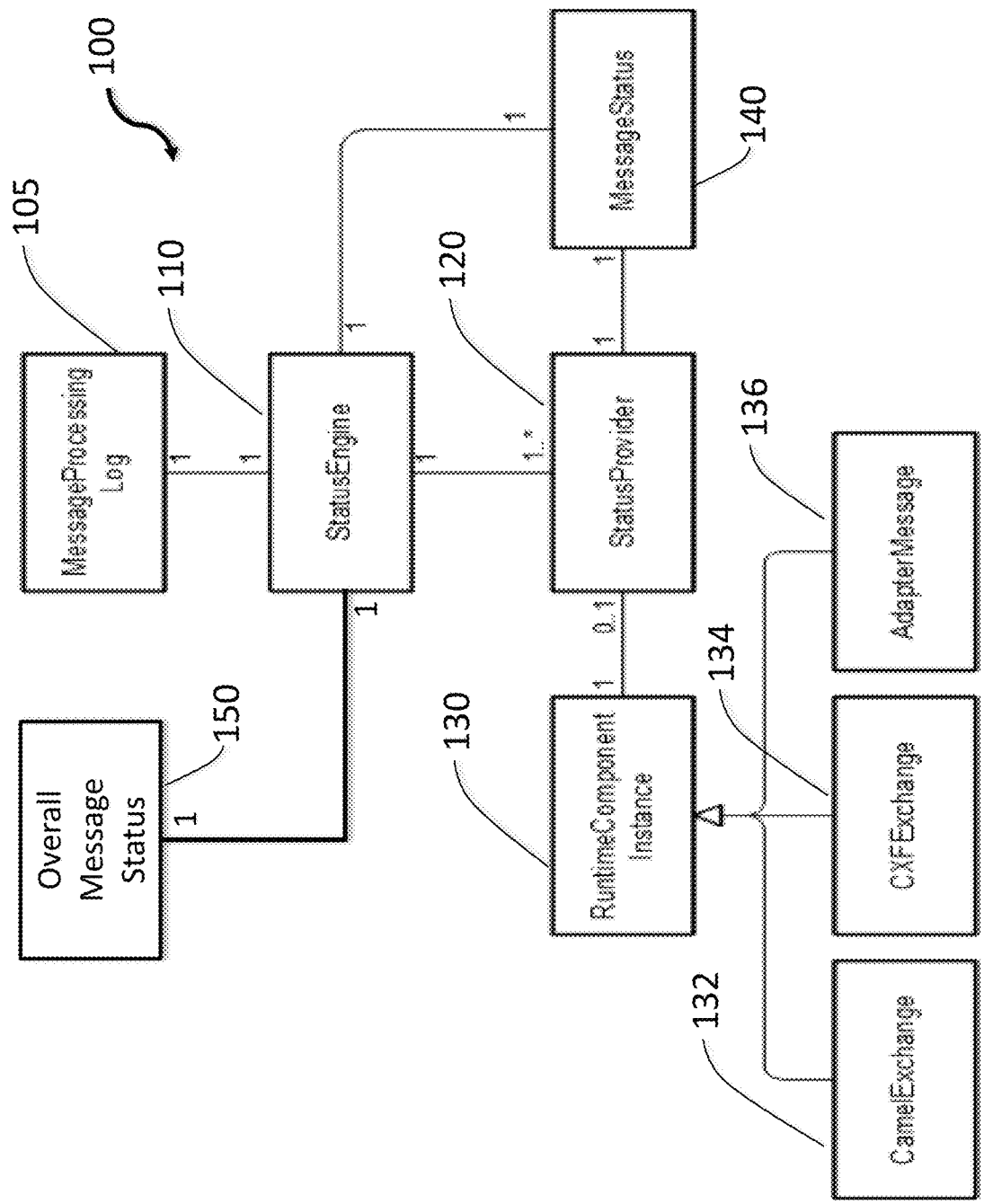
FIG. 1 is a class diagram for components of a system for determining an overall message status in a message processing system having distributed message processing components.

FIG. 1 is a class diagram for components of a system 100 for determining an overall message status in a message processing system having distributed message processing components. A Message Processing Log 105 is associated with a Status Engine 110, which calculates the overall message status based on a collection of Status Providers 120. There may be one Status Provider 120 provided for each runtime component instance 130, whose processing activity is logged by the Message Processing Log 105 via the Status Provider 120. Each of the Status Provider 120 instances is associated with a Message Status 140. These statuses form the basis upon which the Status Engine 110 calculates the overall message status. Status Providers 120 may be created for various runtime component instances 130, such as Camel exchanges 132, CXF exchanges 134, Adapter Messages 136, etc. It is not necessary for each runtime component instance 130 to have its own Status Provider 120 because the overall status calculation can be based on the status of the other runtime component instances 130, i.e., the instances which do have Status Provider 120. For example, relatively simple Adapter Messages 136 may rely completely on status handling by Camel exchange 132 or CXF exchange 134 runtime component instances 130, because adapters typically do not have asynchronous steps before or after processing by the Camel runtime instances.

The lines connecting the component types (i.e., component classes) in this class diagram indicate an association between the connected classes. The numbers at the ends of the lines denote the cardinality relationship between the classes, i.e., how many components of a class are associated with how many components of a connected class. In the example depicted in FIG. 1, the Message Processing Log 105 class and the Status Engine 110 class are connected via a line and both are annotated with a numeral 1, which means that each Message Processing Log 105 is associated with exactly one Status Engine 110, and each Status Engine 110 is associated with exactly one Messaging Processing Log 105. As a further example, the line between the Status Engine 110 class and the Status Provider 120 class indicates that each Status Engine 110 is associated with one or more Status Providers 120 (i.e., "1 . . . *"), but each Status Provider 120 is associated with only one Status Engine 110 (i.e., "1"). Similarly, each runtime component instance 130 may be associated with no Status Providers 120 or one Status Provider 120 (i.e., "0 . . . 1"). This means, in effect, that a Status Provider 120 is optional for a runtime component instance 130. Each Status Provider 120, on the other hand, is associated with exactly one runtime component instance 130 (i.e., "1"). According to these class relationships, the system 100 can have several Status Providers 120 and from all the statuses which are reported by Status Providers 120 the Status Engine 110 determines an overall status for the message processing.

An arrow (representing inheritance) points toward the runtime component instance 130 and has three branches connecting to representations of message processing components, any of which may form the runtime component instance 130. In disclosed embodiments, the message system may include various different message processing components, such as, for example: (1) Apache Camel, which is an open source product that uses exchanges to transport messages from one system to another; (2) Apache CXF, which is an open source product that is used for transporting messages from one system to another but with a different focus than Camel; and (3) Adapter Message, which is a runtime component that can send messages from the system or receive messages into the system.

As an example involving the Adapter Message component, a message is received by one adapter (i.e., one instance of the Adapter Message component) and this adapter converts the message into a Camel exchange 132. The Camel exchange 132 is then processed further and at the end of runtime this Camel exchange 132 is converted into a CXF exchange 134. The CXF exchange 134 is then sent to a receiving system. Thus, for one incoming message, there may be, e.g., three different representations of the single message and each of these three representations can report its own status. Adapter Message components may be configured for various different message protocols and types of conversions. For example, the Adapter Message component may be configured to receive and convert a file based message into various protocols. Other types of messages which can be handled by the Adapter Message component include JMS, AS2, SOAP, etc.

The Status Engine 110 is associated with one or more Status Providers 120 (i.e., "1 . . . k"), from which it receives status information to produce an Overall Message Status 150. Each Status Provider 120 is associated with one Message Status 140 entity, because each outputs its own message status. Thus, the Status Engine 110 and Overall Message Status 150 classes are associated on a one-to-one basis, as are the Status Provider 120 and Message Status 140 classes. In disclosed embodiments, the Overall Message Status 150 and the Message Status 140 may be the same class, i.e., may be of the same form from an implementation standpoint, even though their contents are determined differently.

In disclosed embodiments, different runtime components may process the same message, so one component may start to process the message, then a second component may process the message, and then further components may process the same message. Furthermore, several such runtime components may process the same message in parallel. Each runtime component (i.e., each runtime component instance) has its own notion of a message status, so if the work of a particular component is done successfully, then that component will provide a status for the message such as, e.g., successful, completed, or successfully completed. If, on the other hand, an error occurs in the processing of a message by a particular component, then the message status will indicate that the message was not processed successfully. Thus, for one particular message, there may be different information regarding its status from individual components and these statuses may differ from the overall status. For example, one component may report failure for the message and then another component may repeat the processing of the message, which may result in a completed status. Therefore, the system must distinguish situations where one status event changes the overall status from failed to completed, for example, or other situations where one status event changes the overall status from completed to failed.

Figure 2:
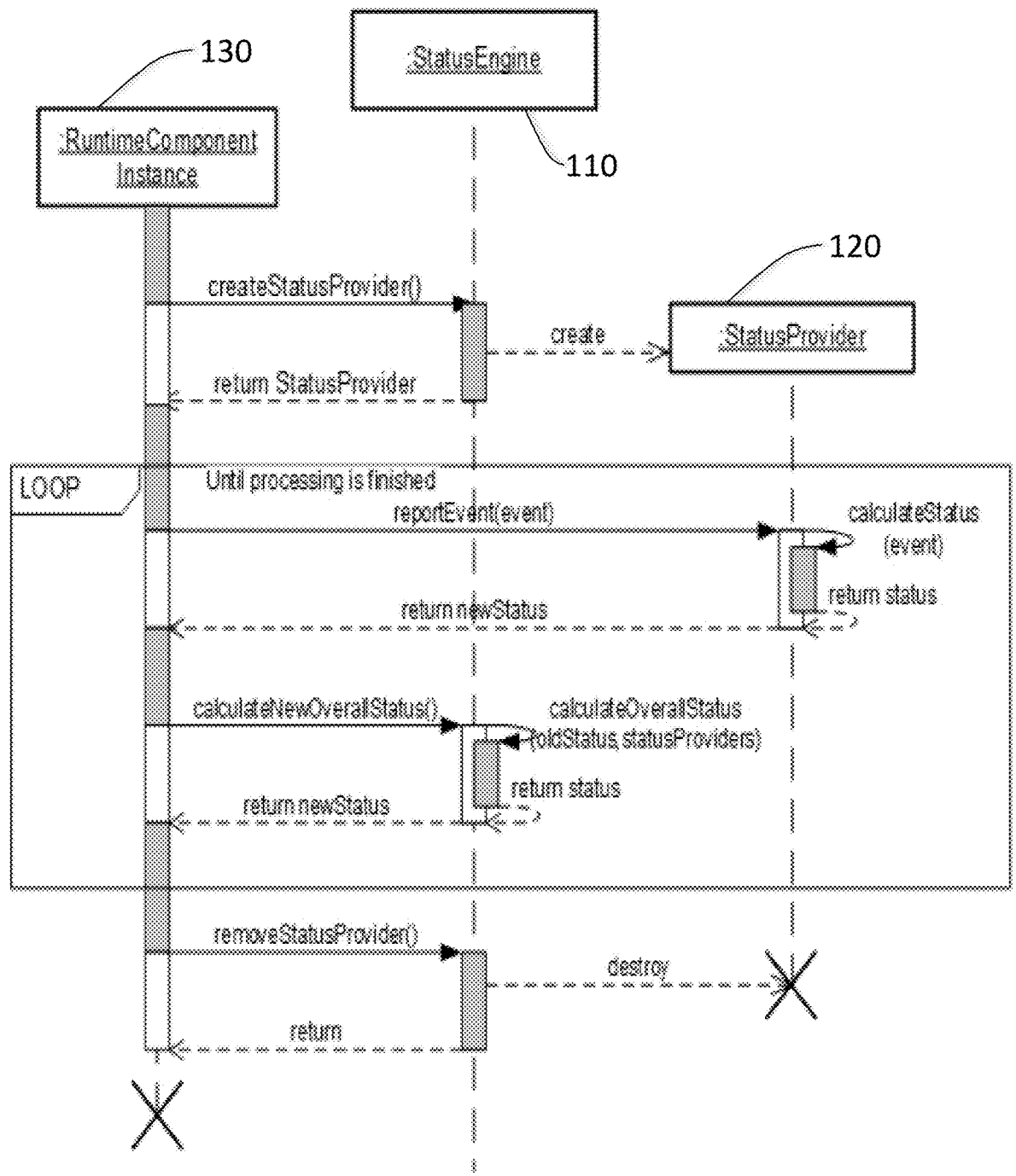
FIG. 2 is a sequence diagram of a method of determining an overall message status in a message processing system having distributed message processing components.

FIG. 2 is a sequence diagram of a method of determining an overall message status in a message processing system having distributed message processing components. To contribute to Message Processing Log 105 status handling, a runtime component instance 130 calls the method createStatusProvider on the Status Engine 110, which creates a new Status Provider 120, registers it with the Status Engine 110, and returns a reference to the calling runtime component instance 130, which stores the reference for later use. During message processing by the system, the runtime component instance 130 reports status change events to its Status Provider 120. Based on its existing "local" status, the Status Provider 120 calculates a new local status based at least in part on the received status change event and returns the new local status to the runtime component instance 130. The runtime component instance 130 stores the new local status in the current Message Processing Log part and triggers the calculation of the new overall status by the Status Engine 110. The Status Engine 110 calculates the new overall status based on the old overall status and the statuses of all the Status Providers 120 which are registered, i.e., instantiated or "active," at that time. The new overall status is returned to the runtime component instance 130, which may store it as new overall status in the Message Processing Log 105. This sequence can be repeated several times until message processing in the runtime component instance 130 is finished.

For convenience, a method may be called with particular parameters to perform the steps described above. A boolean parameter can be used to remove the Status Provider 120 immediately after the status calculation (e.g., if it is set to "true"). This is typically used for Camel exchange and CXF status reporting, where only one status is reported per Status Provider 120. In disclosed embodiments, the boolean parameter may be false for adapter status reporting, where there is one Status Provider 120 for the adapter, which can be used to report several status events and therefore is not removed after a single status report.

Referring again to FIG. 2, the runtime component instance 130 (see, e.g., FIG. 1) starts by calling the Status Engine 110 with a request to create a Status Provider 120. The Status Engine 110 creates a Status Provider 120, and a reference to the created Status Provider 120 is returned to the runtime component instance 130. This Status Provider 120 is used by the runtime component instance 130 to report status events. The status reporting may happen several times, and the typical flow is that first a new status event is reported and then, based on an event model, a new local status is calculated for the Status Provider 120. The new local status is calculated from the old status of the Status Provider 120 and the newly reported event, as described in further detail below. Therefore, depending on the existing local status, the same event can result in different local statuses of the Status Provider 120. The new status is returned to the runtime component instance 130 and then the calculation of the new overall status is triggered in the Status Engine 110. The Status Engine 110 uses the old overall status and the current status provided by a number of Status Providers 120 to calculate the new overall status, which is returned to the runtime component instance 130. The reporting of status events and the calculation of the new overall status can happen several times, thereby forming a loop which may be executed until the message processing is finished.

There may be multiple runtime component instances 130, each of which reports events to a corresponding Status Provider 120 and triggers a calculation of a new overall status in parallel with the other runtime component instances 130. Therefore, in the calculation of the new overall status, the Status Engine 110 may receive inputs from more than one Status Provider 120. Consequently, if a particular runtime component instance 130 has finished the processing of a message, it removes its own Status Provider 120 from the Status Engine 110, i.e., "destroys" the Status Provider 120. Therefore, if there are other runtime component instances 130 which process the same message and trigger calculation of a new overall status, the Status Provider 120 belonging to the finished runtime component instance 130, which is now irrelevant, will not be used in the calculation.

Figure 3:
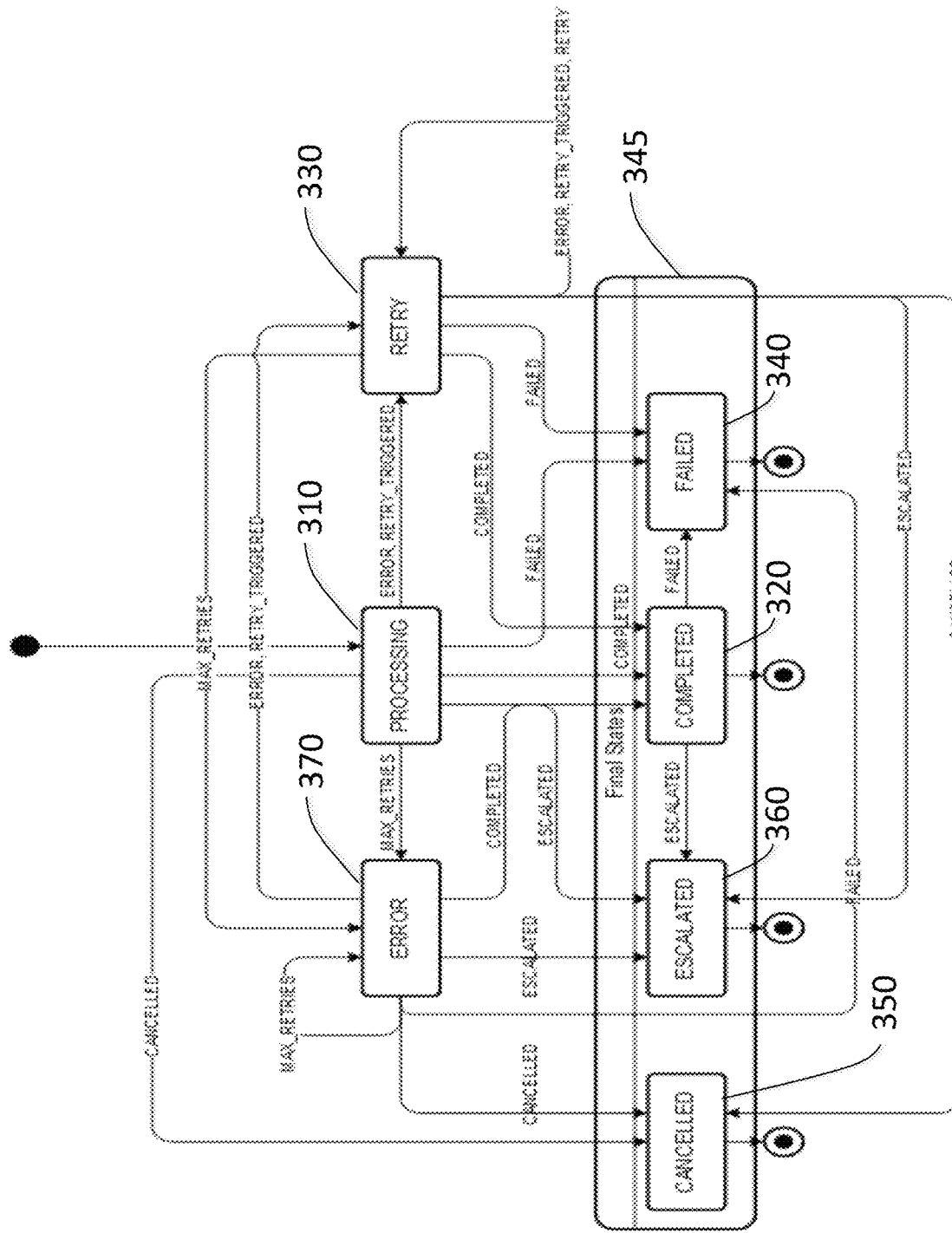
FIG. 3 is a state diagram for calculation of a new local status by a Status Provider upon receiving an event report from a runtime component instance.

FIG. 3 is a state diagram for calculation of a new "local" status by a Status Provider 120 upon receiving a status change event report from its respective runtime component instance 130. Each state of this diagram corresponds to one of the available message statuses and each transition corresponds to a message status event. The boxes depict existing, i.e., old, statuses and the arrows are annotated with a status event and indicate a transition from one status to another status, i.e., a transition from an old status to a new status. For example, if the local status (i.e., old status) for a particular runtime component instance 130 is PROCESSING 310 and the reported status event is "completed," then the status will transition from PROCESSING 310 to COMPLETED 320. If the reported event is "error" or "retry_triggered," then the status will transition from PROCESSING 310 to RETRY 330, which will be the new local status. This means that the runtime component instance 130 which reports this event has run into an error but will try again to complete the message processing. Thus, this error is effectively an intermediate error which will result in a transition to state RETRY 330, where the processing will be tried again, possibly multiple times. If, on the other hand, the reported status event is "failed," the state will transition from PROCESSING 310 to FAILED 340. In such a case, no retries will be executed, because the status is in one of the final states 345. Thus, if something goes wrong with the message processing, there will be a difference in the status change from PROCESSING 310 depending on the particular reported status event.

As a further example, if the old status is RETRY 330, e.g., due to an earlier error, and the reported status event is "error, retry triggered," then the status will remain in the RETRY 330 state. The status will remain in the RETRY 330 state until: a "max_retries" event is reported and there is a transition to the ERROR state 370; the processing is successfully completed; an escalation event is reported; or a cancellation is reported. Cancellation is a manual action which allows a user of the system to explicitly cancel a message which is in processing or retry or any other of the non-final states. This may be done, for example, by selecting the message and pressing a cancel button, which means that the message processing is stopped immediately and the state transitions to CANCELLED 350. Escalation is performed automatically by the system. When the message goes into the ESCALATED 360 state, it means that the message is not processed any further and an additional alert is sent to an administrator. Under particular circumstances, the status may transition from COMPLETED 320 to FAILED 340. This may occur if a component has reported a status of "completed" and transitioned to the COMPLETED 320 state but, after some period of time, a "failed" status is reported. This scenario may result from a deficiency in a runtime component which causes it to report "completed" even though processing of the message is not actually completed.

Figure 4:
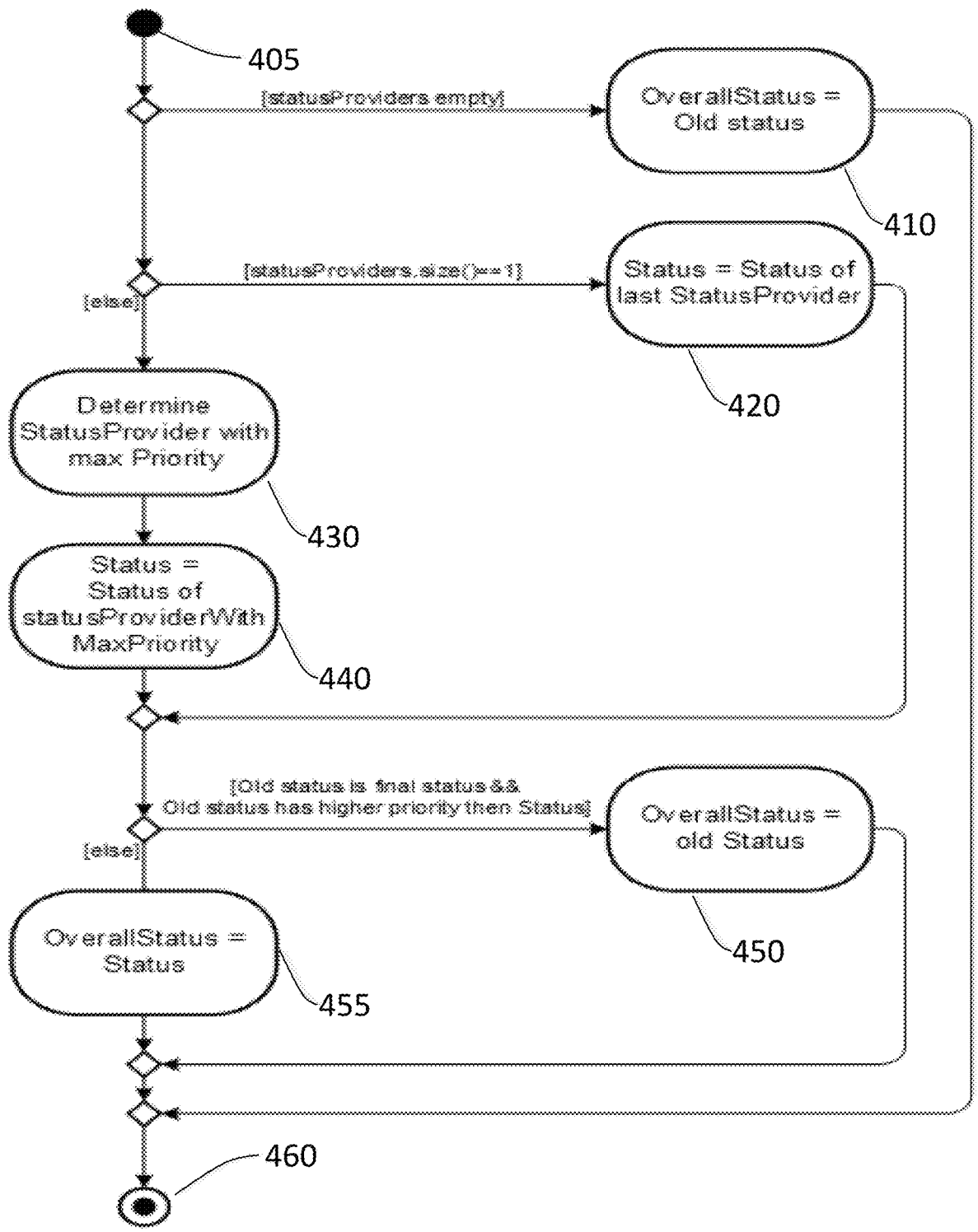
FIG. 4 is an activity diagram depicting calculation of a new overall message status by the Status Engine based on statuses from the Status Providers.

FIG. 4 is an activity diagram (i.e., flow chart) depicting calculation of a new overall status by the Status Engine 110 based on statuses received from the Status Providers 120. The calculation begins with an old overall status as an input 405 and, if there are no active Status Providers 120, then the new overall status is equal to the old overall status (step 410) and the calculation is completed. If there is only one active Status Provider 120, then an intermediate calculated status ("Status") is set equal to the status of the single active Status Provider 120 (step 420). If there is more than one active Status Provider 120, the Status Provider 120 with the maximum priority status is determined (step 430) and an intermediate calculated status is set equal to this maximum priority status (step 440). If the old status is a final status and has a priority higher than the intermediate calculated status (i.e., the maximum priority status among the Status Providers), then the overall status remains set as the old overall status (step 450) and the calculation is completed (460). If the intermediate calculated status has a higher priority than the old overall status, or if the old overall status was not a final status, then the new overall status is set equal to the intermediate calculated status (455).

FIG. 5 is a code excerpt showing values being assigned to parameters for the priority and finality of each state in a set of defined message processing status states. In this example, the Completed status has a priority of zero, the Failed status has a priority of 10, Processing has a priority of 100, Cancelled has a priority of 210 and Escalated has a priority of 220. The specific priority values may be determined somewhat arbitrarily, because it is the order of the priority values which establishes the hierarchy of the status states. In this example, the Completed state has the lowest priority in the status calculation, and the Escalated status has the highest priority. In addition, the states which are designated to be final states (see, e.g., FIG. 3) are indicated with a true/false parameter (i.e., the parameter immediately following the priority value).

As discussed above, if there are multiple active Status Providers 120, the one with the highest priority is taken (subject to further conditions) as the new overall status. The final statuses COMPLETED 320 and FAILED 340 have the lowest priority because if there is at least one other message processing branch active, they will be overridden. In contrast to that, the final statuses CANCELLED 350 and ESCALATED 360 have the highest priority, because they are meant to override all other statuses and to not be overridden by any other statuses. Consequently, when a message is cancelled or escalated in one branch, the whole message (i.e., the overall status) becomes CANCELLED 350 or ESCALATED 360, respectively, and this status cannot be changed because no other statuses have a higher priority. Between these two end points are the non-final statuses PROCESSING 310, RETRY 330, and ERROR 370, which can override the COMPLETED 320 and FAILED 340 statuses but are overridden by the CANCELLED 350 and ESCALATED 360 statuses.

Figure 6:
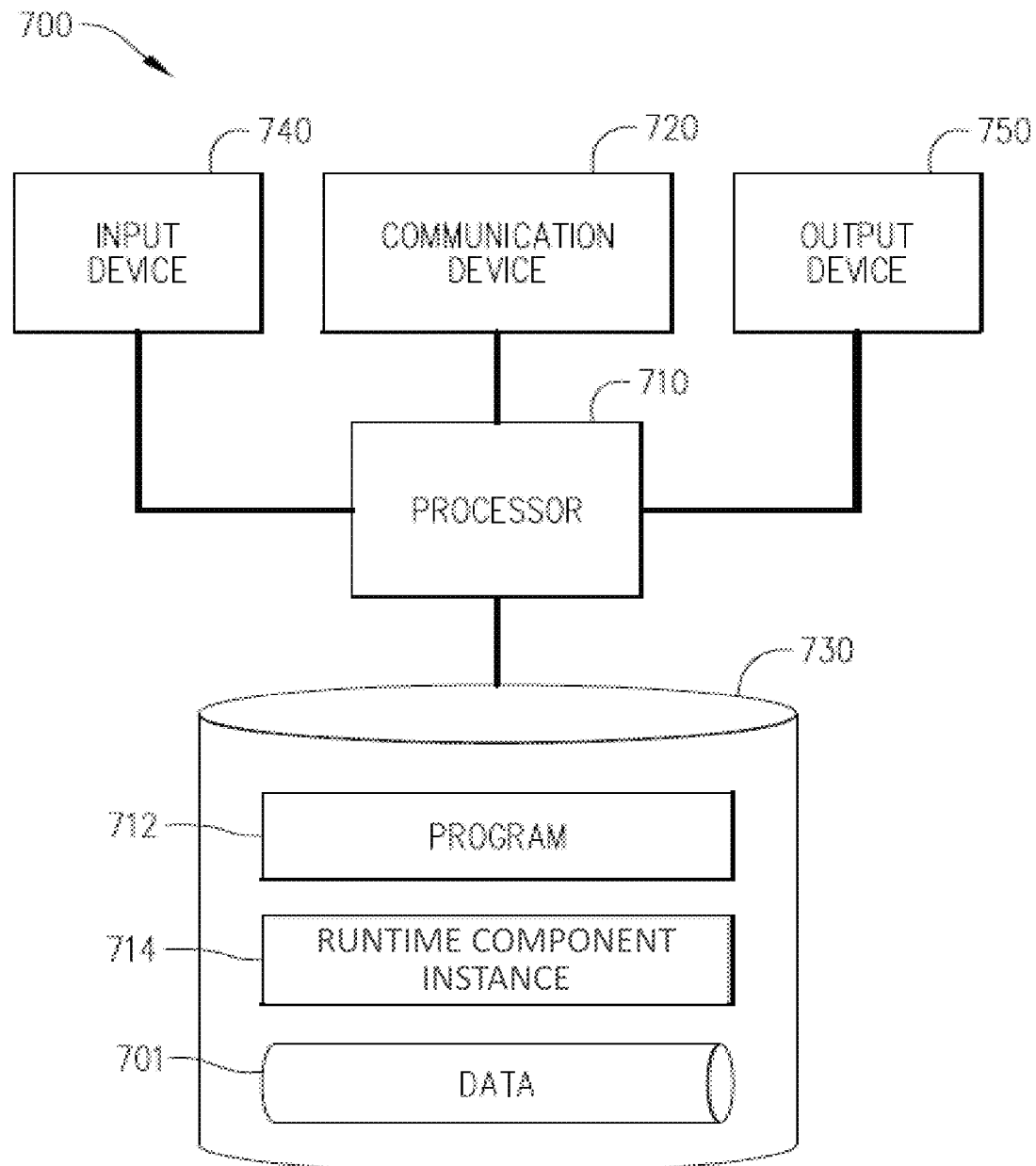
FIG. 6 is a block diagram of a system according to some embodiments.

FIG. 6 is a block diagram of an apparatus 700 according to some embodiments. The apparatus 700 may comprise a general-purpose or a special-purpose computing apparatus and may execute program code to perform any of the functions described herein. The apparatus 700 may comprise an implementation of one or more elements of system 100. The apparatus 700 may include other unshown elements according to some embodiments.

The apparatus 700 includes a PIH processor 710 operatively coupled to a communication device 720, a data storage device/memory 730, one or more input devices 740, and one or more output devices 750. The communication device 720 may facilitate communication with external devices, such as an application server 130. Input device(s) 740 may comprise, for example, a keyboard, a keypad, a mouse or other pointing device, a microphone, knob or a switch, an infra-red (IR) port, a docking station, and/or a touch screen. The input device(s) 740 may be used, for example, to manipulate graphical user interfaces and to input information into apparatus 700. Output device(s) 750 may comprise, for example, a display (e.g., a display screen) a speaker, and/or a printer.

The data storage device/memory 730 may comprise any device, including combinations of magnetic storage devices (e.g., magnetic tape, hard disk drives and flash memory), optical storage devices, Read Only Memory (ROM) devices, Random Access Memory (RAM) etc. The storage device 730 stores a program 712 and/or PIH platform logic 714 for controlling the processor 710. The processor 710 performs instructions of the programs 712, 714, and thereby operates in accordance with any of the embodiments described herein. The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A method of determining an overall message status in a message processing computer system, the method comprising:

registering at least one status provider with a central Status Engine after creation of the status provider, wherein the central Status Engine is attached to the overall message;

receiving, by the central Status Engine running on a processor, message statuses output by active status providers, wherein the status provider is a message processing component and is the active status provider upon registration with the central Status Engine, the active status providers being adapted to output message statuses for respective runtime component instances, wherein each of the message statuses for the respective runtime component instance contributes to the overall message status, the active status providers and runtime component instances executing on one or more computer processors having associated memory, the message statuses being from a defined set of message statuses, each of the message statuses in the defined set having a designated priority;

determining, by the central Status Engine, a quantity of active status providers and based on the determined quantity:

determining, if there are no active status providers, that the overall message status is to remain equal to an old overall message status, determining, if there is only one active status provider, an intermediate calculated status which is equal to a message status of the one active status provider, and determining, if there are more than one active status providers, an intermediate calculated status which is equal to a highest priority message status among message statuses of said more than one active status providers, determining an overall status based at least in part on the intermediate status; and returning the determined overall status to the runtime component instance.

2. The method of claim 1, wherein, if there are one or more active status providers, the determining of the overall status comprises:

determining that the overall message status is to remain equal to the old overall message status if the old overall message status is a designated final status and if the old overall message status has a higher priority than that of the intermediate calculated status, and setting the overall message status to be equal to the intermediate calculated status if the old overall message status is not a designated final status or if the old overall message status does not have a higher priority than that of the intermediate calculated status.

3. The method of claim 1, further comprising creating the status providers in response to requests from the respective runtime component instances.

4. The method of claim 1, wherein the overall message status is determined each time a message status is received from an active one of the status providers.

5. The method of claim 1, further comprising removing a status provider after a message status is received from the status provider.

6. The method of claim 1, wherein the creating of the status providers is performed by the central Status Engine in response to requests received by the central Status Engine from the respective runtime component instances.

7. The method of claim 1, wherein the central Status Engine sends a reference for a created status provider back to the respective runtime component instance in response to the request.

8. A system for determining an overall message status in a message processing computer system, the system comprising one or more computer processors having associated memory, said one or more computer processors being configured to perform:

registering at least one status provider with a central Status Engine after creation of the status provider, wherein the central Status Engine is attached to the overall message;

receiving, by the central Status Engine, message statuses output by active status providers, wherein the status provider is a message processing component and is the active status provider upon registration with the central Status Engine, the active status providers being adapted to output message statuses for respective runtime component instances, wherein each of the message statuses for the respective runtime component instance contributes to the overall message status, the active status providers and runtime component instances executing on said one or more computer processors having associated memory, the message statuses being from a defined set of message statuses, each of the message statuses in the defined set having a designated priority;

determining, by the central Status Engine, a quantity of active status providers and based on the determined quantity:

determining, if there are no active status providers, that the overall message status is to remain equal to an old overall message status, determining, if there is only one active status provider, an intermediate calculated status which is equal to a message status of the one active status provider, and determining, if there are more than one active status providers, an intermediate calculated status which is equal to a highest priority message status among message statuses of said more than one active status providers, determining an overall status based at least in part on the intermediate status; and returning the determined overall status to the runtime component instance.

9. The system of claim 8, wherein the creating of the status providers is performed by the central Status Engine in response to requests received by the central Status Engine from the respective runtime component instances.

10. The system of claim 9, wherein the central Status Engine sends a reference for a created status provider back to the respective runtime component instance in response to the request.

11. The system of claim 8, wherein, if there are one or more active status providers, said one or more computer processors are configured to perform:

determining that the overall message status is to remain equal to the old overall message status if the old overall message status is a designated final status and if the old overall message status has a higher priority than that of the intermediate calculated status, and setting the overall message status to be equal to the intermediate calculated status if the old overall message status is not a designated final status or if the old overall message status does not have a higher priority than that of the intermediate calculated status.

12. The system of claim 8, wherein said one or more computer processors are further configured to perform creating the status providers in response to requests from the respective runtime component instances.

13. The system of claim 8, wherein the overall message status is determined each time a message status is received from an active one of the status providers.

14. The system of claim 8, wherein said one or more computer processors are further configured to perform removing a status provider after a message status is received from the status provider.

15. A non-transitory computer-readable medium storing program instructions executed by one or more processors of a computer system having memory, the medium comprising instructions for causing the one or more processors to perform:

registering at least one status provider with a central Status Engine after creation of the status provider, wherein the central Status Engine is attached to the overall message;

receiving, by the central Status Engine running on a processor, message statuses output by active status providers, wherein the status provider is a message processing component and is the active status provider upon registration with the central Status Engine, the active status providers being adapted to output message statuses for respective runtime component instances, wherein each of the message statuses for the respective runtime component instance contributes to the overall message status, the active status providers and runtime component instances executing on one or more computer processors having associated memory, the message statuses being from a defined set of message statuses, each of the message statuses in the defined set having a designated priority;

determining, by the central Status Engine, a quantity of active status providers and based on the determined quantity:

determining, if there are no active status providers, that the overall message status is to remain equal to an old overall message status, determining, if there is only one active status provider, an intermediate calculated status which is equal to a message status of the one active status provider, and determining, if there are more than one active status providers, an intermediate calculated status which is equal to a highest priority message status among message statuses of said more than one active status providers, determining an overall status based at least in part on the intermediate status; and returning the determined overall status to the runtime component instance.

16. The computer-readable medium of claim 15, wherein, if there are one or more active status providers, the determining of the overall status comprises:

determining that the overall message status is to remain equal to the old overall message status if the old overall message status is a designated final status and if the old overall message status has a higher priority than that of the intermediate calculated status, and setting the overall message status to be equal to the intermediate calculated status if the old overall message status is not a designated final status or if the old overall message status does not have a higher priority than that of the intermediate calculated status.

17. The computer-readable medium of claim 15, further comprising creating the status providers in response to requests from the respective runtime component instances.

18. The computer-readable medium of claim 15, wherein the overall message status is determined each time a message status is received from an active one of the status providers.

19. The computer-readable medium of claim 15, further comprising removing a status provider after a message status is received from the status provider.

20. The computer-readable medium of claim 15, wherein the creating of the status providers is performed by the central Status Engine in response to requests received by the central Status Engine from the respective runtime component instances.

* * * * *